Patented May 8, 1951

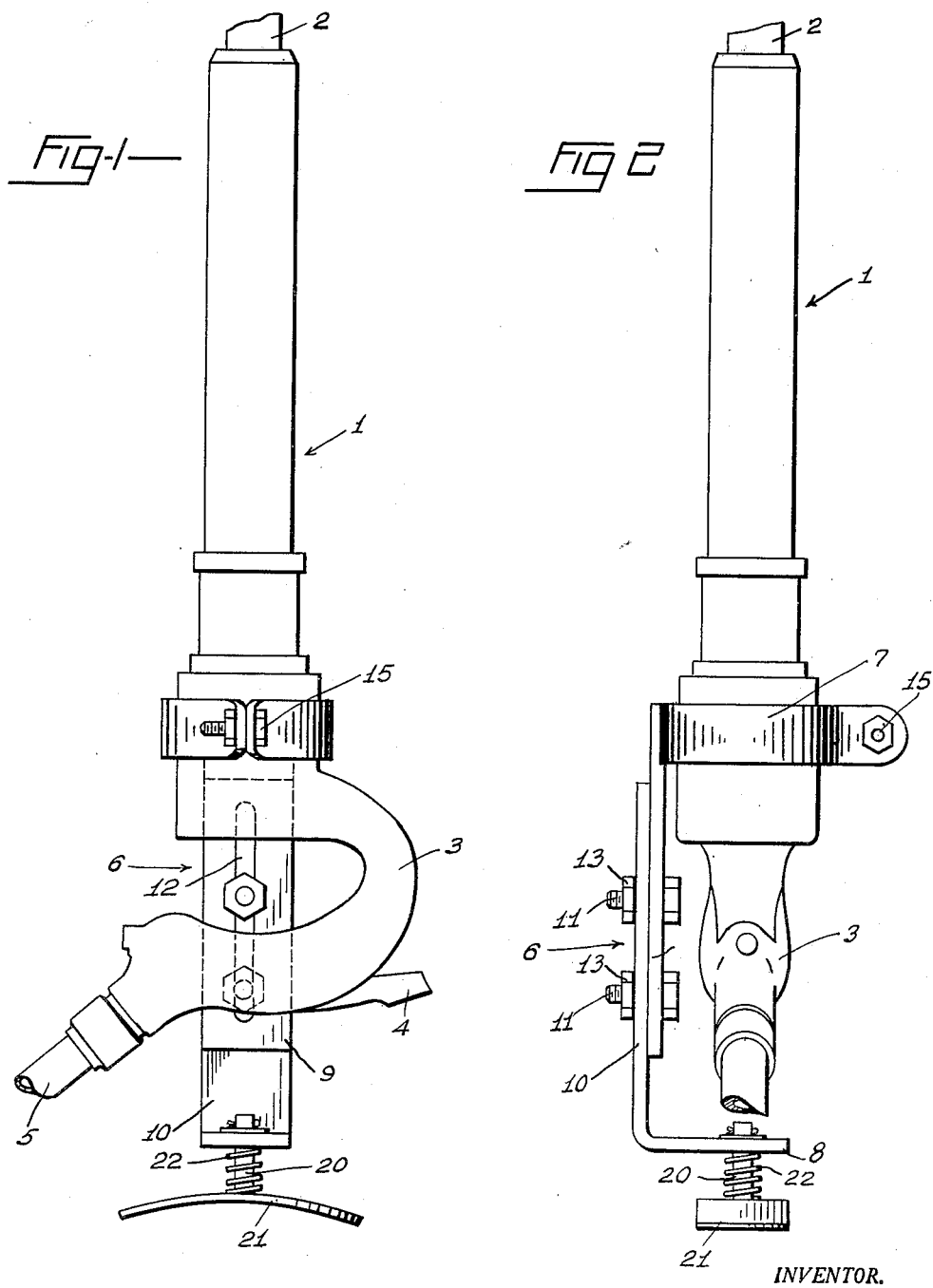

2,551,769

UNITED STATES PATENT OFFICE 2,551,769

SHOCK ABSORBER FOR AIR GUNS

William J. Sieben, Alameda, Calif.

Application November 19, 1945, Serial No. 629,468

5 Claims. (Cl. 121—36)

This invention relates to a shock absorber for a manually portable air gun, such as used for riveting, hammering, drilling, etc., and which shock absorber is particularly intended for use when the gun is used for bottom riveting or for any work where the gun is used for working upwardly.

Bottom riveting, such as in the case of making or repairing ships' bottoms, or where the bottoms of block supported storage tanks are riveted, it is the custom for the operator to be seated on a block with the right or left upper leg generally horizontal. The conventional manually portable air gun is used, which gun has a handle at one end for manual grasping and the operating tool is at the other end. A right handed operator grasps the handle in his right hand with the back of the hand against the right leg. The gun is then held in generally vertically extending position with the operating tool uppermost and against the rivet. The weight of the tool is on the right upper leg when the tool is so held, and heretofore the shock of the gun is taken by the right leg, although the right hand of the operator, and to some extent his entire body, receives the shock. The result is very tiring and is ultimately painful, and is also detrimental to the nervous system and to the various organs of the body.

The principal object of the present invention is the provision of a simple, cheap, light and efficient shock absorber that is adapted to be readily attached to any conventional air gun without altering the latter, and which absorber absorbs the detrimental shock from the air gun without requiring the operator to change his usual method of using the gun.

Another object of the invention is the provision of a shock absorber that enables the operator to relieve the tension that has heretofore been produced in his right hand by rotating the gun on its axis while it is in operation and while it is supported on the upper leg of the operator.

Other objects and advantages will appear in the description and in the drawings.

In the drawings, Fig. 1 is a side elevational view of a conventional air gun with my shock absorber thereon.

Fig. 2 is a side-elevational view of the air gun and shock absorber as seen at right angles to the view of Fig. 1.

In detail, a conventional air gun is indicated generally at 1, which air gun is elongated with an operating tool 2 of any desired type at one end, and a handle 3 at the opposite end, which handle is adapted to be grasped by the right or left hand of the operator, and in bottom riveting the back of the hand is down or facing outwardly of the gun. A control trigger 4 is on the handle and an air line 5 connects with the handle for supplying air to the gun (Fig. 1). All this is old in the art.

The shock absorber comprises a generally U-shaped member 6 having opposed spaced legs 7, 8 connected at one of their ends by a connecting piece, which latter piece may comprise overlapping extensions 9, 10 of legs 7, 8 respectively. The piece 9 may carry bolts 11 that extend through a slot 12 in leg 10. This enables the adjustment of the spacing between legs 7, 8, and once the spacing is as desired, nuts 13 on said bolts may secure the extensions 9, 10 rigidly together.

The leg 7 is in the form of a split annular clamp, the split side being opposite the side from which the extension 9 extends. This clamp is adapted to embrace the cylindrical portion of the gun adjacent handle 3, and a bolt 15 extending through the ends of the clamp at opposite sides of the split (Fig. 1) is for tightening the clamps to the gun so that the shock absorber is tight on the gun. The character of the clamps permit any desired adjustment of the shock absorber about the central axis of the gun.

The leg 8 of the shock absorber is in generally opposed relation to leg 7 and is spaced outwardly of the outer side of the handle 3 a distance that is substantially greater than is required for clearing the hand of the operator when such hand is grasping the handle.

The leg 8 is formed with an opening that is preferably coaxial with the axis of the gun 1, and a pin 20 slidably extends through said opening. The outer end of pin 20 has a saddle-like element 21 secured thereto, which element is a strip that extends transversely across said axis and which strip is concave on its outwardly facing side for following the cross-sectional contour of the upper side of the upper leg of the operator. A coil spring 22 around pin 20 reacts between the leg 8 and the said element 21 to yieldably hold said element spaced outwardly of leg 8.

The space between leg 8 and the handle 3 is such that when the hand of the operator is between handle 3 and leg 8 in grasping relation to the handle with the back of the hand facing leg 8, there will be room to permit full compression of spring 22 and consequent movement of pin 20 toward such hand without the pin striking the hand.

The spring 22 has sufficient strength to support the gun on the saddle-like element 21 without substantial compression of the spring, but upon use of the gun the spring will yield sufficiently to absorb the shock.

In operation, in bottom riveting, a right handed operator would grasp the handle 3 with the right hand, the back of the hand facing the leg 8. The saddle-like element 21 is positioned on the right upper leg of the operator and the gun is held generally upright on said leg by the left hand. The operator is seated and the right upper leg is substantially horizontal. In this position the right upper leg of the operator virtually takes the weight of the gun and urges the tool 2 against the rivet. The shock from the gun is substantially absorbed by the spring 22. If the hand that is grasping the handle should become tense or cramped, the operator can readily rotate the gun on its axis to relieve the tension due to the pin 20.

The structure as described is preferred, but it is obvious that the spring tension of the U-shaped member 6 may in itself absorb considerable shock where the material of said member is relatively resilient. The gun is not as easy to hold on the rivet as with the device disclosed in the drawings.

It is to be understood that the detailed description and drawings are not to be considered restrictive of the invention, but merely illustrative thereof.

I claim:

1. In combination with a manually portable elongated air gun having a handle at one end for manual grasping and an operating tool at the opposite end, a shock absorber comprising a generally U-shaped member, one leg of which is secured to said gun adjacent said handle at one side of the latter and the other leg of which is at the opposite side of said handle spaced from said handle and with its outer end substantially on the longitudinal axis of said gun whereby said handle may be manually grasped through the open side of said member, an element rotatably secured to the outer end of said other leg for movement about an axis parallel with the longitudinal axis of said gun, said element being arranged and adapted to engage the upper portion of a leg of the operator when the gun is used for bottom riveting so as to support said gun and a spring between said element and said other leg for taking the shock of the gun.

2. In combination with a manually portable elongated air gun having a handle at one end for manual grasping and an operating tool at the opposite end, a shock absorber comprising a generally U-shaped member, one leg of which is secured to said gun adjacent said handle at one side of the latter and the other leg of which is at the opposite side of said handle spaced from said handle and with its outer end substantially on the longitudinal axis of said gun whereby said handle may be manually grasped through the open side of said member, a saddle rotatably supported at a point centrally of its length on the outer end of said other leg for supporting the said outer end of said other leg on the leg of the operator when the gun is used for bottom riveting and the like, a spring between said saddle and said outer end of said other leg for absorbing shock from said gun.

3. A shock absorber for an elongated manually portable air gun of the type provided with a handle at one end for manual grasping by the operator comprising a substantially U-shaped member, one of the legs of said member comprising a clamp adapted to be secured to such air gun adjacent said handle for rigidly securing said member to such gun in a position with both legs at spaced points along the longitudinal axis of the gun and extending transversely of said axis and with the handle of the latter disposed between said legs and positioned for grasping through the open side of said U-shaped member; a saddle-like element rotatably secured at a point centrally of its length to the outer end of the other leg of said member for rotation about such axis, the legs of said member being spaced apart sufficiently for positioning said handle therebetween in spaced relation thereto, and said element being positioned outwardly of said other leg for engagement with the upper leg of the operator, a spring supporting said element spaced from said leg for absorbing the shock of the gun when the said shock absorber is on such gun and when the saddle-like element supports the said shock absorber and gun on said upper leg of the operator.

4. A shock absorber for a manually portable elongated air gun having a handle at one end for manual grasping and an operating tool at the opposite end comprising: a generally U-shaped member providing a pair of legs connected together at one of their ends with their opposite ends being free and spaced apart, means on one leg of said pair for securing said one leg to said one end of such gun with the said other leg of said pair extending across the longitudial axis of said gun and spaced from said handle and from said one end of the latter, the spaced free ends of said legs opposite their connected ends being spaced a sufficient distance to enable the hand of an operator to pass between said free ends for grasping said handle, a saddle carried by said other leg, a pivot securing said saddle to said other leg at the side of the latter remote from said one leg for rotation of said saddle about said axis when said one leg is secured to said one end of said gun.

5. A shock absorber for a manually portable elongated air gun having a handle at one end for manual grasping and an operating tool at the opposite end comprising: a generally U-shaped member providing a pair of legs connected together at one of their ends with their opposite ends being free and spaced apart, means on one leg of said pair for securing said one leg to said one end of such gun with the said other leg of said pair extending across the longitudinal axis of said gun and spaced from said handle and from said one end of the latter, the spaced free ends of said legs opposite their connected ends being spaced a sufficient distance to enable the hand of an operator to pass between said free ends for grasping said handle, a saddle carried by said other leg, a pivot securing said saddle to said other leg at the side of the latter remote from said one leg for rotation of said saddle about said axis when said one leg is secured to said one end of said gun, a spring between said saddle and said other leg yieldably urging said saddle in direction away from said other leg, and said pivot being slidable axially thereof for permitting movement of said saddle toward said other leg against the resistance of said opening.

WILLIAM J. SIEBEN.

REFERENCES CITED

The following references are of record in the file of this patent:

UNITED STATES PATENTS

| Number | Name | Date |
|---|---|---|
| 839,727 | Carnahan | Dec. 25, 1906 |
| 896,679 | Prellwitz | Sept. 15, 1908 |
| 1,293,251 | Troeger | Feb. 4, 1919 |
| 1,531,960 | Lengyel | Mar. 31, 1925 |
| 1,935,065 | Stevens | Nov. 14, 1933 |

OTHER REFERENCES

Jap "Knee Mortar" in "Life" magazine Feb. 22, 1943.